Patented May 20, 1930

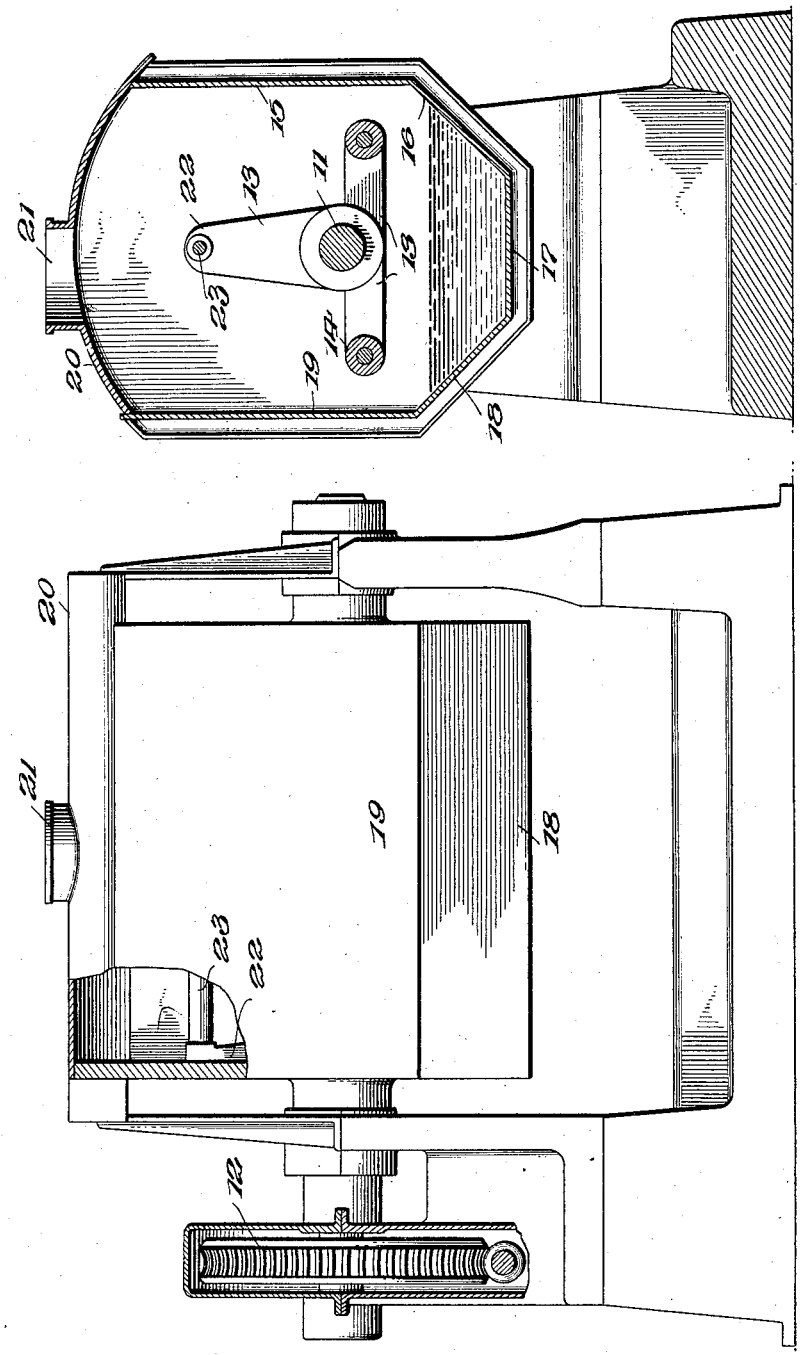

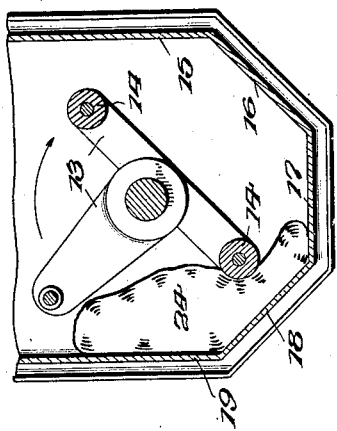
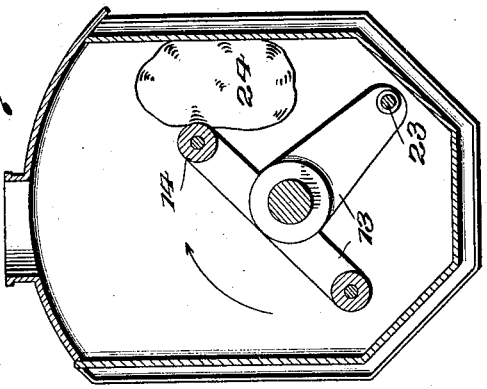
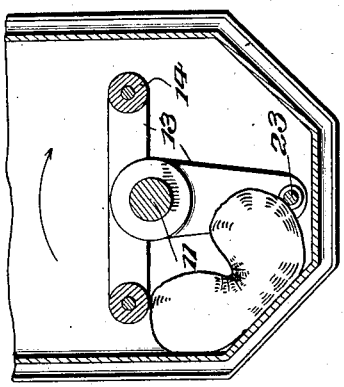
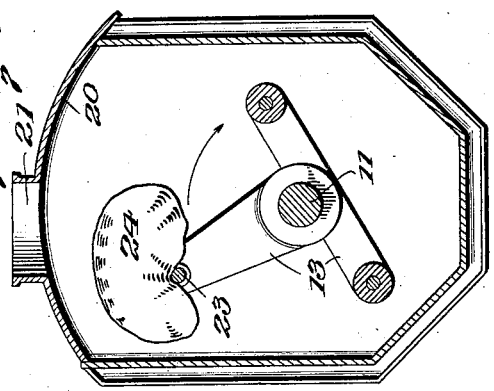
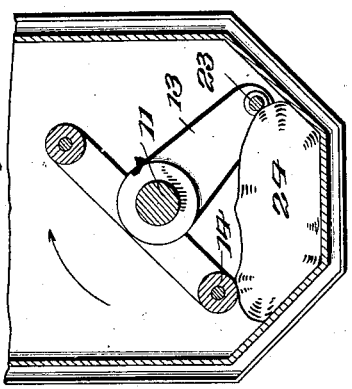
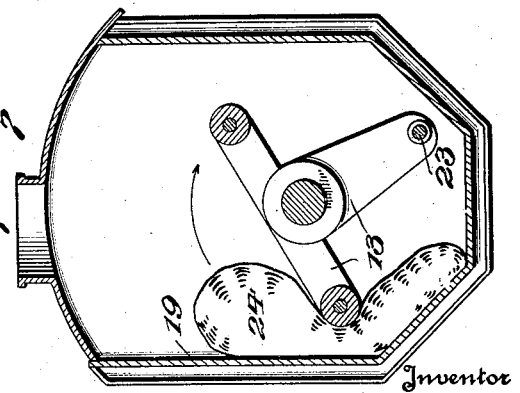

1,759,290

UNITED STATES PATENT OFFICE

JOHN M. VAN HOUTEN, OF BEACON, NEW YORK, ASSIGNOR TO DUTCHESS TOOL COMPANY, OF BEACON, NEW YORK, A CORPORATION OF NEW YORK

DOUGH-MIXING APPARATUS

Application filed July 3, 1929. Serial No. 375,720.

This invention relates to dough mixing apparatus.

Broadly, the invention contemplates a novel form of apparatus wherein the ingredients are formed into a plastic mass of dough which is then manipulated and worked with a rubbing pressure. The apparatus also comprises means for intermittently inverting the plastic mass whereby the rubbing pressure referred to will be successively applied to different or opposite sides of the mass. In this way, it is believed the ingredients are thoroughly and completely incorporated in the finished dough in a period of time less than that required with some of the other types of apparatus heretofore used.

To augment this incorporation or mixing of the ingredients, the present invention also contemplates an apparatus comprising a mixing receptacle having a plurality of contiguous or adjoining substantially flat surfaces along which the plastic mass of dough is rubbed.

The preferred form of apparatus is illustrated in the accompanying drawings wherein, Fig. 1 is a longitudinal section, portions being shown broken away;

Fig. 2 is a transverse sectional view; and

Figs. 3 to 8 illustrate the several manipulations of the plastic mass of dough.

In accordance with the invention, the receptacle 10 has a shaft 11 extending longitudinally therethrough, rotary motion being imparted to said shaft by gearing 12 adapted to be driven from any suitable source of power. Mounted on said shaft, at each end thereof, are one or more radially disposed arms 13, two being shown in the present instance, and fixed in the outer ends of said arms are bars 14 conveniently termed rubbing bars. When revolved these bars are adapted to apply a rubbing pressure to a plastic mass of dough positioned against the inner wall of said receptacle, the bars being equi-distantly spaced from the working surfaces of said receptacle. For this reason, shaft 11 is arranged concentrically of said receptacle.

Preferably, the interior wall of the receptacle is formed of a plurality of substantially flat surfaces, one merging into the other, whereby the mass of dough will be caused to travel in paths directly angular to each other. These surfaces are indicated at 15, 16, 17, 18, and 19, surfaces 15 and 19 constituting the sides and the others the bottom of the receptacle. As no rubbing of the dough is to be done in the upper portion of the receptacle, the relative positions of shaft 11 and cover 20 are immaterial. Cover 20 may be secured in place in any suitable manner and is provided with an observation opening 21.

Also mounted on shaft 11 are arms 22 in which is mounted a bar 23. Arms 22 are longer than arms 13 so that bar 23 is somewhat closer to the surfaces 15, 19 than bars 14. The purpose of this peculiar arrangement of bar 23 is that, by being relatively close to surfaces 15, 19, said bar will substantially engage beneath the mass of dough, instead of rubbing over the exposed surface thereof, and will pick up the mass, so to speak, and turn it over or invert it. Therefore, each time the two bars successively engage the mass of dough the rubbing pressure will be applied to a different surface or alternately to opposite surfaces.

This manipulation of the plastic mass is illustrated more or less diagrammatically in Figs. 3 to 8. As shown in Fig. 3, the bar 14 has just passed over the mass 24 and as bar 23 comes into engagement with said mass, the latter is picked up as shown in Fig. 4 and inverted. When the bars 14 next come into contact with the mass of dough, they engage a different surface or the surface opposite that previously engaged. This is shown in Fig. 5. These successive rubbing pressures imposed on the mass advance it along the flat surfaces of the receptacle so that it occupies the position shown in Fig. 6 by the time it is engaged the second time by bar 23 whereupon said bar picks it up off of surface 19 and carries it across through the upper portion of the receptacle, thus transferring it to surface 15 as shown in Fig. 7. During this transfer the mass is again reversed or inverted, a different surface thereof being presented to bars 14 as they come into contact therewith as shown in Fig. 8. The same manipulations are then repeated until the batch is thoroughly and completely mixed.

Describing these operations in general terms, the arms 14 intermittently apply successive rubbing pressures to the mass, the latter being turned during the period between each two successive rubbings, one turning being accomplished during the advance of the mass along surfaces 15 to 19 and the other during the transfer from surface 19 back to surface 15, whereby a different surface is rubbed each time the two bars 14 come into contact with the mass.

This peculiar method of applying rubbing pressures to the dough for thoroughly mixing or incorporating the ingredients in the mass and the advantages thereof, are more fully set forth in an application filed by applicant and in which said method is claimed independently of the apparatus.

What I claim is:

1. In a dough manipulating machine, the combination of a receptacle having a multiplicity of substantially flat surfaces directly angularly disposed in relation to each other and means for advancing a plastic mass of dough along said surfaces with a rubbing pressure applied to the surface of said mass, the advance of the dough being periodically interrupted by the individual surfaces, and means for turning the mass when its advance is thus interrupted.

2. In a dough manipulating machine, the combination of a receptacle having a multiplicity of substantially flat surfaces on its inner wall, said surfaces being directly angularly disposed in relation to each other and merging one into the other, and means adapted to engage only the surface of a plastic mass of dough for advancing it successively along said surfaces of said receptacle, the advance of the dough being periodically interrupted by the individual surfaces, and means for turning the mass when its advance is thus interrupted.

3. In a dough manipulating machine, the combination of a receptacle having a multiplicity of substantially flat surfaces on its inner wall merging one into the other, and directly angularly disposed in relation to each other, and a rubbing member equidistantly spaced from each of said surfaces for advancing a plastic mass of dough successively along said surfaces with a rubbing pressure applied to the surface of said mass, the advance of the dough being periodically interrupted by the individual surfaces, and means for turning the mass when its advance is thus interrupted.

4. In a dough manipulating machine, the combination of a receptacle having a plurality of substantially flat surfaces on its inner wall, and means revoluble about an axis arranged concentrically of said surfaces and adapted to engage only the surface of a plastic mass of dough to advance the mass along said surfaces of the receptacle, the advance of the dough being periodically interrupted by the individual surfaces, and means for turning the mass when its advance is thus interrupted.

5. In a dough manipulating machine, the combination of a receptacle having a plurality of substantially flat surfaces on its inner wall, and means for exerting a rubbing pressure on the surface of a plastic mass of dough and advancing said mass along said flat surfaces, said means being revoluble about an axis arranged concentrically of said surfaces, the advance of the dough being periodically interrupted by the individual surfaces, and means for turning the mass when its advance is thus interrupted.

6. In a dough manipulating machine, the combination of a receptacle having a plurality of substantially flat surfaces on its inner wall, a shaft arranged concentrically of said surfaces, and a plurality of bars equidistantly spaced from said surfaces and revoluble about said shaft for exerting a rubbing pressure on the surface of a plastic mass of dough and advancing said mass along said flat surfaces, the advance of the dough being periodically interrupted by the individual surfaces, and means for turning the mass when its advance is thus interrupted.

7. In a dough manipulating machine, the combination of a receptacle, means for advancing a plastic mass of dough along the inner surface of said receptacle with a rubbing pressure applied to the surface only of said mass, said inner surface being subdivided into portions directly angularly disposed in relation to each other and means for inverting said mass on said surface of the receptacle.

8. In a dough manipulating machine, the combination of a receptacle, means for subjecting a plastic mass of dough on the inner surface of said receptacle to a rubbing pressure applied to the surface only of said mass, said inner surface being subdivided into portions directly angularly disposed in relation to each other and advancing said mass along said surface of the receptacle, and means for inverting said mass during such advance.

9. In a dough manipulating machine, the combination of a receptacle having a plurality of substantially flat surfaces directly angularly disposed in relation to each other, means for advancing a plastic mass of dough along said surfaces with a rubbing pressure applied to the surface of the mass, and means for successively presenting different surfaces of said mass to said rubbing pressure.

10. In a dough manipulating machine, the combination of a receptacle having a plurality of substantially flat surfaces directly angularly disposed in relation to each other, means for advancing a plastic mass of dough along said surfaces with a rubbing pressure applied to the surface of the mass, and means for inverting said mass during its movement along said surfaces of the receptacle.

11. In a dough manipulating machine, the combination of a receptacle having a plurality of substantially flat surfaces directly angularly disposed in relation to each other and merging one into another, means for advancing a plastic mass of dough with a rubbing pressure from one end of said surfaces to the other end thereof, said pressure being applied only to the surface of said mass, and means for inverting said mass of dough during its advance along said flat surfaces and for transferring said mass from the last mentioned end of the flat surfaces to the first end and for inverting said mass during said transfer.

12. In a dough manipulating machine, the combination of a receptacle having a series of adjoining substantially flat surfaces directly angularly disposed in relation to each other, means for intermittently applying successive rubbing pressures to the surface of a plastic mass of dough on said flat surfaces to advance said mass along the same, and means for inverting said mass on said flat surfaces between said intermittent successive pressures.

13. In a dough manipulating machine, the combination of a receptacle having a series of adjoining substantially flat surfaces directly angularly disposed in relation to each other, a shaft, radially disposed arms on said shaft, bars fixed to said arms and revoluble about said shaft, said bars being equidistantly spaced from said flat surfaces, said bars being adapted to engage the surface only of a plastic mass of dough and advance it along said surface with rubbing pressure exerted on the surface of said mass, and means for inverting said mass during such advance.

14. In a dough manipulating machine, the combination of a receptacle having a series of adjoining substantially flat surfaces directly angularly disposed in relation to each other, a shaft, radially disposed arms on said shaft, bars fixed to said arms and revoluble about said shaft, said bars being equidistantly spaced from said flat surfaces, said bars being adapted to engage the surface only of a plastic mass of dough and advance it along said surface with rubbing pressure, and a third bar revoluble about said shaft adapted to invert said mass during its advance along said surfaces.

JOHN M. VAN HOUTEN.